(12) United States Patent
Sevindik

(10) Patent No.: US 11,564,105 B2
(45) Date of Patent: Jan. 24, 2023

(54) MULTILINK UPLINK GRANT MANAGEMENT METHOD

(71) Applicant: CHARTER COMMUNICATIONS OPERATING, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 118 days.

(21) Appl. No.: 17/165,419

(22) Filed: Feb. 2, 2021

(65) Prior Publication Data
US 2022/0248234 A1 Aug. 4, 2022

(51) Int. Cl.
*H04W 16/14* (2009.01)
*H04W 76/11* (2018.01)
*H04W 72/12* (2009.01)
*H04W 72/14* (2009.01)
*H04W 72/04* (2009.01)

(52) U.S. Cl.
CPC ......... *H04W 16/14* (2013.01); *H04W 72/042* (2013.01); *H04W 72/1268* (2013.01); *H04W 72/14* (2013.01); *H04W 76/11* (2018.02)

(58) Field of Classification Search
CPC ... H04W 16/14; H04W 76/11; H04W 72/042; H04W 72/1268; H04W 72/14
See application file for complete search history.

(56) References Cited

U.S. PATENT DOCUMENTS

| 9,980,280 B2 | 5/2018 | Guan et al. | |
| 10,904,950 B2 * | 1/2021 | Ahmet | H04W 40/22 |
| 11,375,526 B1 * | 6/2022 | Sevindik | H04W 72/04 |
| 2017/0367110 A1 | 12/2017 | Li et al. | |
| 2019/0313464 A1 | 10/2019 | Einhaus et al. | |
| 2021/0120408 A1 * | 4/2021 | Pazhyannur | H04W 8/183 |
| 2021/0136838 A1 * | 5/2021 | Khalid | H04W 28/24 |
| 2021/0219143 A1 * | 7/2021 | Khalid | H04W 76/14 |
| 2021/0306853 A1 * | 9/2021 | Gundavelli | H04W 12/06 |
| 2021/0306854 A1 * | 9/2021 | Gundavelli | H04W 8/24 |
| 2022/0046460 A1 * | 2/2022 | Samuel | H04W 28/10 |
| 2022/0124850 A1 * | 4/2022 | Gundavelli | H04W 76/15 |
| 2022/0151019 A1 * | 5/2022 | Balasubramanian | H04W 24/08 |
| 2022/0182944 A1 * | 6/2022 | Sevindik | H04W 52/367 |

(Continued)

FOREIGN PATENT DOCUMENTS

WO 2018048176 A1 3/2018
WO WO-2022098561 A1 * 5/2022

*Primary Examiner* — Michael J Moore, Jr.
(74) *Attorney, Agent, or Firm* — Meagher Emanuel Laks Goldberg & Liao, LLP

(57) ABSTRACT

Various embodiments comprise systems, methods, and apparatus for enabling UE attached to a mobile network via a mid-band CBSD node to continue transmitting upload data to the mid-band CBSD node even in the event of a loss of Physical Downlink Control Channels (PDCCH) coverage of the CBSD node resulting in a failure of the UE to receive uplink grant schedule updates. Various embodiments contemplate that the UE responsively attaches to a low-band node which, based on physical cell ID (PCI) of the CBSD node, retrieves updated uplink grant schedules from the CBSD node via a backhaul network and provides the uplink grant schedules to the UE.

21 Claims, 2 Drawing Sheets

(56) References Cited

U.S. PATENT DOCUMENTS

2022/0248234 A1\* 8/2022 Sevindik ............. H04W 72/042
2022/0264312 A1\* 8/2022 Furuichi ............. H04B 7/0617

\* cited by examiner

MULTILINK UPLINK GRANT MANAGEMENT METHOD

FIELD OF THE DISCLOSURE

The present disclosure generally relates to wireless communications systems and related networks, and more particularly to mechanisms for providing user equipment (UE) with uplink grant schedules of provider equipment attached thereto in response to loss of Physical Downlink Control Channel (PDCCH) coverage.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to deploy, for example, indoor voice and data services to enterprises and other customers. For both macrocell RANs and small/micro cell RANs, increasing demands for wireless throughput make access to additional wireless spectrum desirable.

Converged networks contemplate that user equipment (UE) utilizing network services (e.g., voice, streaming media, data upload/download etc.) may access any available/compatible network, such as a WiFi network (e.g., 802.11xx networks), UMTS network, 5G-NR network and so on, preferably in a manner delivering network services to UE in a seamless manner. Converged network operators may deploy networks comprising base stations, eNBs and the like operating in multiple spectral regions, such as high bands (24 GHz-40 GHz for 5G), mid bands (3.5 GHz-6 GHz and/or 1 GHz-2.6 GHz for 4G/LTE/5G), and low bands (1 GHz for 4G/LTE/5G).

Converged networks may configured to use both licensed and unlicensed spectrum, such as unlicensed spectrum associated with citizens broadband radio service (CBRS), a 150 MZ band between 3.55 GHz and 3.70 GHz. Access is granted to Citizens Broadband Radio Service Devices (CBSDs) such as base stations, eNBs, user devices and the like operating according to a Generic Authorized Access (GAA) from 3.55 GHz to 3.65 GHz, with full access to 3.70 GHz expected in the future. GAA compliance may at times require a reduction in transmit power/range of CBSDs functioning as base stations/eNBs, such as when a GAA-define prioritized user requires this spectrum, which reductions may impact converged network operation in a manner causing non-seamless delivery of network services to UE.

SUMMARY

Various deficiencies in the prior art are addressed by systems, methods, and apparatus for enabling UE attached to a mobile network via a mid-band CBSD node to continue transmitting upload data to the mid-band CBSD node, even in the event of a loss of Physical Downlink Control Channels (PDCCH) coverage of the CBSD node resulting in a failure of the UE to receive uplink grant schedule updates. Various embodiments contemplate that the UE responsively attaches to a low-band node which, based on physical cell ID (PCI) of the CBSD node, retrieves updated uplink grant schedules from the CBSD node via a backhaul network and provides the uplink grant schedules to the UE.

One embodiment provides a method for allocating resources in a 5G network comprising Citizens Broadband Radio Service Device (CBSD) nodes and non-CBSD nodes configured for communicating with user equipment (UE), the method comprising: at a non-CBSD node, receiving a UE message reporting a physical cell ID (PCI) of a CBSD node to which the UE was attached prior to losing Physical Downlink Control Channels (PDCCH) coverage of the CBSD; at the non-CBSD node, transmitting toward a 5G core manager a message configured to cause a session management function (SMF) to resolve an internet protocol (IP) address associated with the reported PCI, and to forward to the non-CBSD node a message including the resolved IP address of the reported PCI; at the non-CBSD node, using the resolved IP address of the reported PCI to transmit toward a corresponding CBSD node a request for a new uplink grant schedule; and at the non-CBSD node, transmitting a received new UL grant schedule toward a source UE of the received UE message, the new UL grant schedule being configured to enable the source UE to transmit data toward the CBSD node via resource blocks allocations defined within the UL grant schedule.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
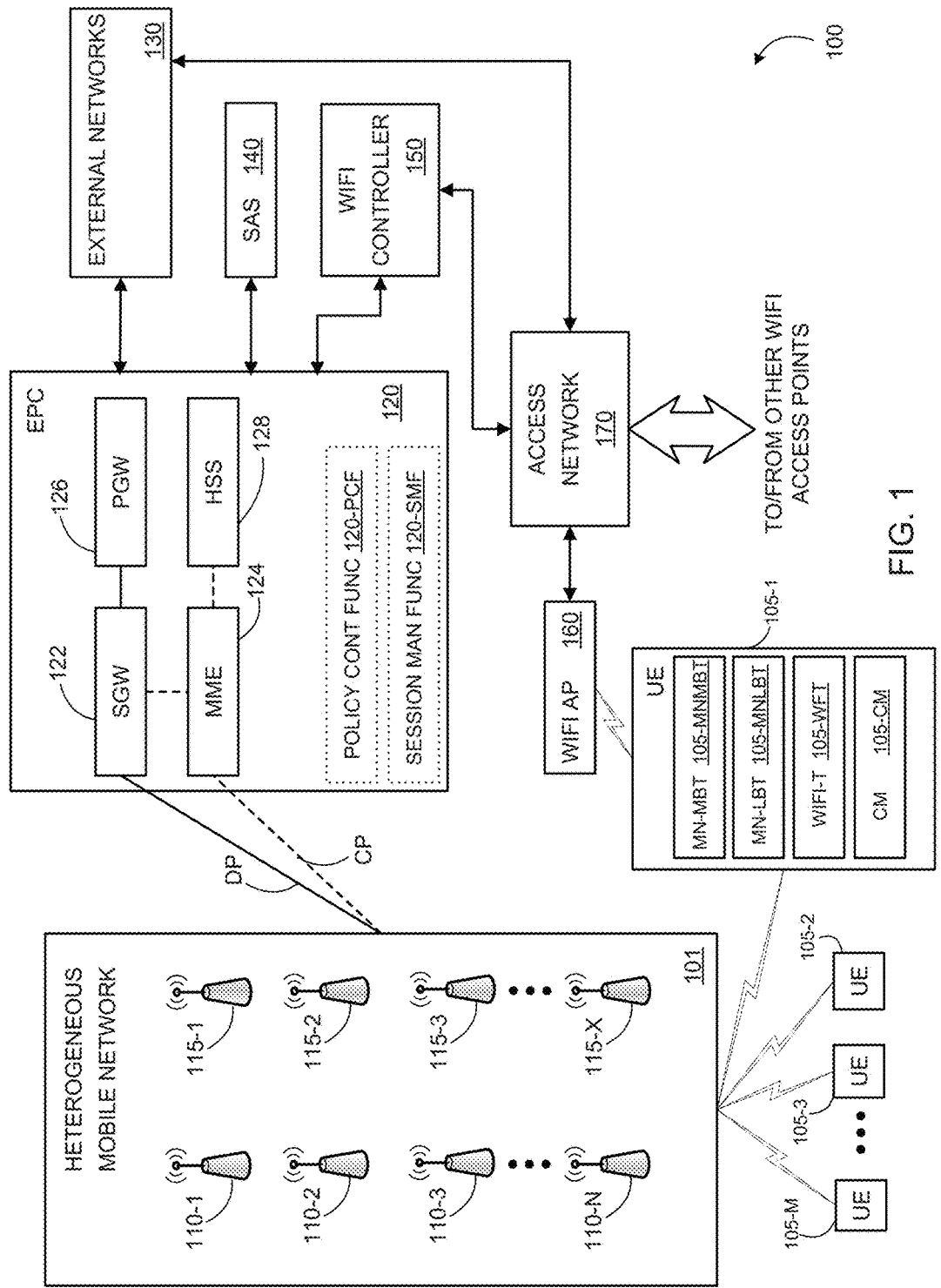
FIG. 1 depicts a block diagram of a system using a low power wide area (LPWA) network useful in illustrating the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments find particular utility within the context of converged networks configured to enable user equipment (UE) to access subscriber services via any of a plurality of available wireless networks as long as the QoS requirements are satisfied, such as a Wi-Fi network, 4G/LTE/5G network, unlicensed spectral regions and/or more than one network simultaneously. Unlicensed spectrum may comprise, illustratively, the Citizens Broadband Radio Service (CBRS) band at ~3.5 GHz which is utilized by Citizens Broadband Radio Service Devices (CBSDs) registered with a Spectrum Access System (SAS) capable of adapting CBSD operation in accordance with government requirements, network congestion, network interference and the like. Such CBSD operational adaptations may include a reduction in transmit power/range of CBSDs functioning as base stations, gNBs, or eNBs, which may in turn mean that UEs attached thereto are unable to receive downlink schedule (DL-SCH) and/or uplink schedule (UL-SCH) information normally provided by the CBSD on a physical downlink control channel (PDCCH). Various embodiments are directed to specific mechanisms configured to mitigate this problem.

FIG. 1 depicts a block diagram of a network services architecture suitable for use in various embodiments. Specifically, FIG. 1 depicts a converged network services architecture in which user equipment (UE) utilizing network services (e.g., voice, streaming media, data upload/download etc.) may access any available/compatible network as long as the quality of service (QoS) requirements of the relevant network services are satisfied, such as a WiFi network (e.g., 802.11xx networks) comprising many wireless access points (WAPs) or a heterogeneous mobile network (e.g., 3G, 4G/LTE, 5G) comprising many mid-band and low-band base stations, gNBs, or eNBs.

Referring to FIG. 1, user equipment (UE) 105-1 through 105-M (collectively UE 105) are depicted as being configured for wirelessly communicating with a heterogeneous mobile network 101 (e.g., a LTE or 5G access network) formed as a plurality of base stations, gNBs, or eNBs comprising mid-band (e.g., 3.5 GHz) mobile network nodes 110-1 through 110-N (collectively mid-band nodes 110) and low-band (e.g., under 1 GHz) mobile network nodes 115-1 through 115-X (collectively low-band nodes 115). The heterogeneous mobile network 101 is connected to an evolved packet core (EPC) 120 configured to provide network services thereto, such as from/to external networks 130.

In various embodiments, the UE 105 may also be configured for wirelessly communicating with WiFi Access Points (WAPs or APs) 160, which are connected to a WiFi Controller 150 via, illustratively, an access network 170 such as provided by a telecommunications, cable television, and/or other network services provider. The WAPs 160 may comprise 802.11xx wireless access points at homes, businesses, or other location that are configured to communicate with UE 105 and with an access network 170. In various embodiments, a network services provider utilizes numerous such access points distributed over a "coverage footprint" to provide network services to mobile devices such as the UE 105 discussed herein.

The nodes 110/115 may comprise macrocells, small cells, microcells and the like such as eNodeBs (eNBs), cellular network base stations, 4G/5G repeaters, and similar types of provider equipment or logical radio nodes (e.g., gNBs) derived therefrom. The nodes 110/115 may include nodes that use licensed 3G/4G/LTE/5G spectrum, unlicensed spectrum such as citizens broadband radio service (CBRS) spectrum, or a combination of licensed and unlicensed spectrum. In the case of nodes 110 having Citizens Broadband Radio Service Device (CBSD) capability, allocations of CBRS spectrum are provided via a Spectrum Access System (SAS) 140.

Each node 110/115 provides network services to UE via respective radio bearer (channels/resources) which are managed by various Radio Resource Management functions, such as Radio Bearer Control, Radio Admission Control, Connection Mobility Control, Scheduling of UEs in both uplink and downlink and so on. The Radio Resource Management functions are configured to provide appropriate Quality of Service (QoS) levels to each UE using one or more radio bearers, to maximize throughput at the node 110/115 while maintaining "fairness" to the UE attached thereto, to monitor various performance metrics, to provide data to the core network or network management entities and the like.

For example each node 110/115 may include a Scheduler to implement uplink/downlink scheduling functions so as to allocate radio bearer resources to attached UE in accordance with appropriate QoS levels, which may comprise default QoS levels, QoS levels defined via Service Level Agreements (SLAs) of subscriber-associated with the UE, or some other mechanism. These radio bearer resources may be allocated in accordance with per-bearer QoS parameters such as QoS Class Identifiers (QCIs) which identify particular services or classes of services, Guaranteed Bit Rate (GBR) and/or Prioritized Bit Rate (PBR) which enable a determination as to specific radio bearers (e.g., specific UE) to accept, modify, or drop in response to a constrained resource condition, Allocation and Retention Policies (ARP) and the like. An Aggregate Maximum Bit Rate (AMBR) may be used to define a total bandwidth that may be utilized by a specific group of radio bearers (e.g., total bandwidth used supporting multiple network services associated with a one UE).

In various embodiments, node 110/115 scheduling decisions are dynamically signaled on a L1/L2 physical downlink control channel (PDCCH), which may periodically (e.g., at a 1 ms transmission time interval) provide downlink schedule (DL-SCH) and/or uplink schedule (UL-SCH) information. Additional PDCCH information provided to the UE may comprise physical resource allocation, Modulation and Coding scheme, New-Data indicator, Transport Block size, Redundancy version, HARQ Process ID and the like. To avoid frequent signaling (i.e., every 1 ms) semi-persistent scheduling may also be employed, such as to define UL/DL resources for a radio bearer used for a periodic type of transmission, or a transmission of a known size or duration. For example, resources defined in terms of subcarriers, slots, resource blocks (RBs) and the like may be allocated to specific UE such as in accordance with a resource block map provided to UE via an uplink (UL) grant schedule.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed 3G/4G/LTE/5G spectrum, unlicensed spectrum such as CBRS spectrum, or a combination of licensed and unlicensed spectrum. In the case of nodes 110 having CBSD capability, allocations of CBRS spectrum are provided via 140. The various embodiments contemplate the UE are configured to communicate via at least one mobile network (MN) radio access technology (RAT) such as 3G, 4G/LTE, and 5G, and at least one WiFi access point technology such as 802.11xx (e.g., 802.11b, 802.11a, 802.11g, 802.11n, 802.11ac, 802.11ax and so on).

As depicted in FIG. 1, exemplary UE 105-1 comprises a mobile network mid-band transceiver 105-MNMBT configured for communications with any of mid-band nodes 110, a mobile network low-band transceiver 105-MNLBT configured for communications with any of low-band nodes 115, an optional WiFi transceiver 105-WFT configured for communication with WAP 160, and a connection manager 105-CM configured to manage communications with the nodes 110/115 and APs 160, and to facilitate handoffs and UE migration between different nodes 110/115, between different APs 160, and between mid-band nodes 110 and low-band nodes 115 such as described herein. The UE 105 also comprises various other components, modules, antennas, and the like (not shown). In various embodiments, one or more of the mid-band transceiver 105-MNMBT low-band transceiver 105-MNLBT, and WiFi transceiver 105-WFT maybe combined to reduce the amount of circuitry necessary to implement these functions.

The connection manager 105-CM may be configured to cause the UE to adapt the network or network node used by the UE to receive network services. For example, the connection manager 105-CM may be configured to give priority to WiFi connectivity over mobile network connectivity when WiFi connectivity is available (e.g., to reduce mobile network congestion and the like). Similarly, the connection manager 105-CM may be configured to give priority to mid-band nodes 110 using unlicensed spectrum (e.g., CBSD eNBs) over low-band nodes 115 using licensed spectrum (e.g., 600-900 MHz eNBs).

As depicted in FIG. 1, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within and/or used to manage an evolved packet core, and related communications therewith as will be known to those skilled in the art.

The SGW 122 and PGW 126 handle user data or data plane (DP) functions; they transport internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnection between the radio-side (e.g., via a backhaul connection to the mobile network 101) and the EPC 120. As its name indicates, this gateway serves the UE by routing the incoming and outgoing IP packets. The SGW 122 is the anchor point for intra-LTE mobility (i.e. in case of handover between eNodeBs 110/115) and between LTE, 5G, and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as UE messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

The EPC 120 may comprise a Session Management Function (SMF) 120-SMF, a policy control function (PCF) 120-PCF, and/or other functions in the EPC 120, such as when implemented as a 5G core.

As depicted in FIG. 1, a Spectrum Access System (SAS) 140 communicates with the EPC 120 and is configured to control access to the CBRS frequency band for RANs and other CBSD devices such as nodes 110 and UEs 105. Generally speaking, the SAS 140 is configured to ensure that the CBRS frequency band is allocated in accordance with the regulations promulgated by the relevant authorities. The SAS 140 may also communicate with the network manager 150 to perform various tasks in accordance with the embodiments.

As depicted in FIG. 1, a WiFi controller (WC) 150 communicates with a WiFi Access Point (WAP or AP) 160 via an access network 170. For simplification of the discussion, only one WAP 160 is shown in FIG. 1 as communicating with WiFi controller 150, and only one UE 105 (i.e., UE 105-1) is shown in FIG. 1 as communicating with that WAP 160. The WiFi controller 150, which may be implemented via a general purpose computer server, network operations center (NOC) equipment, or other provider equipment, is configured to perform various WiFi control functions associated with a large number of APs 160, as well as an even larger number of UEs 105 configured to communicate with the various APs 160.

Generally speaking, the WiFi controller (WC) 150 manages various operational aspects of the WAPs 160 and UE 105 connected thereto in accordance with WAP policies, subscriber/user profiles (e.g., such as defined in service level agreements) and the like. For example, each UE may be associated with a corresponding subscriber/user profile having defined therein guaranteed minimum levels of service, such as a minimum WAP download (DL) throughput, minimum uplink (UL) throughput, and/or other minimum QoS levels.

The system 100 of FIG. 1 contemplates UE 105 associated with a network services provider capable of providing network services via either of the mid-band nodes 110 and low-band nodes 115, or the optional WAPs 160.

An exemplary heterogeneous mobile network 101 comprises mid-band nodes 110 including CBSD and non-CBSD eNBs or base stations, and low-band nodes 115 such as 600 MHz eNBs or base stations, wherein the various nodes 110/115 are deployed to provide overlapping coverage areas, though the 600 MHz coverage area of the low-band nodes 115 is generally larger than the 3.5 GHz coverage area of the mid-band nodes 110. The nodes 110/115 are connected to the EPC 120 via back haul and/or other communications links.

Various elements or portions thereof depicted in FIG. 1 and having functions described herein are implemented at least in part as computing devices having communications capabilities, including for example the UE 105, nodes 110/115, SAS 140, WC 150, WAP 160 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
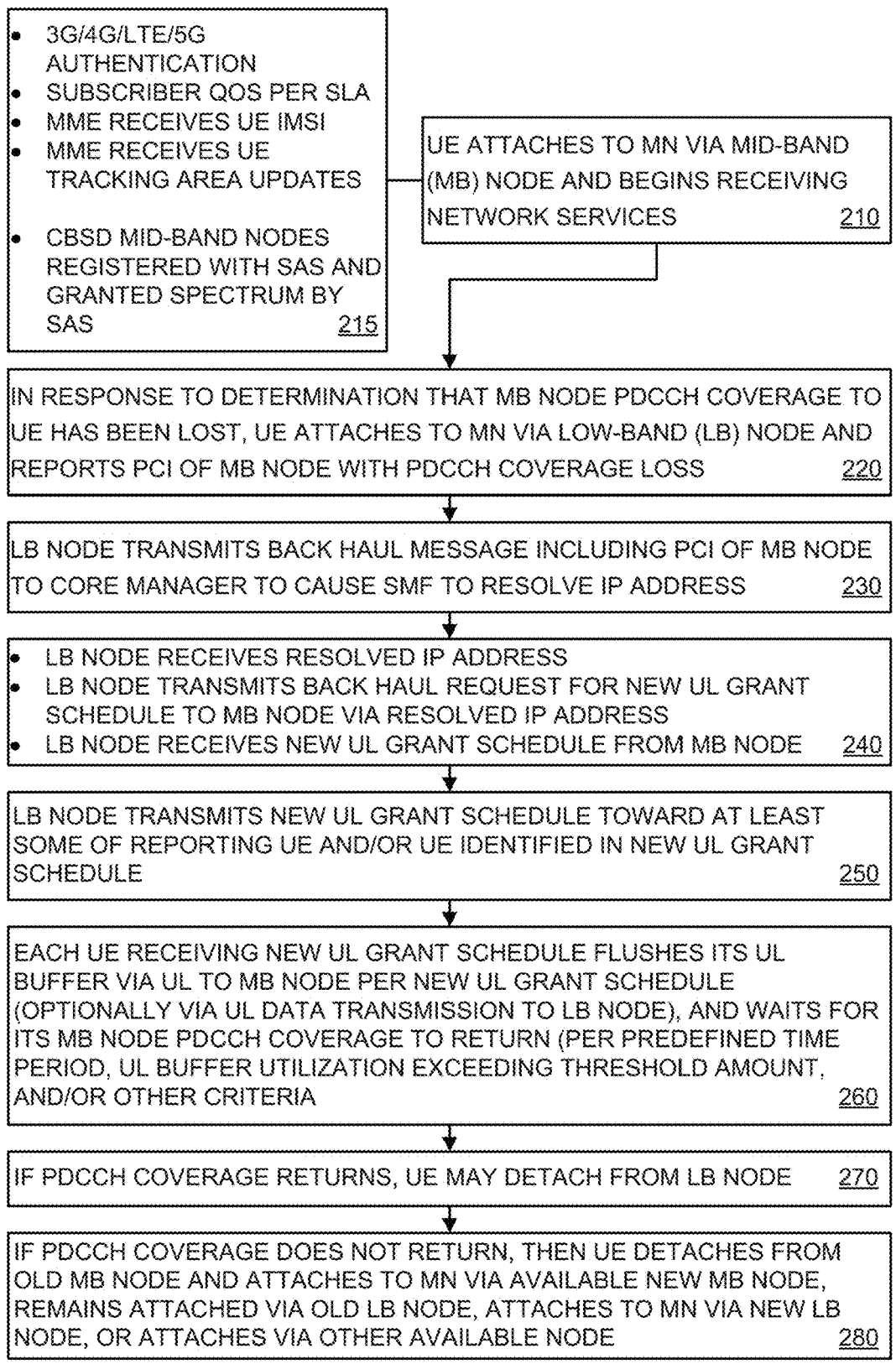
FIG. 2 depicts a flow diagram of a method enabling UE recovery from a loss of uplink (UL) grant schedule due to a CBSD transmission power reduction.

FIG. 2 depicts a flow diagram of a method enabling UE recovery from a loss of UL grant schedule due to a CBSD transmission power reduction. The method 200 of FIG. 2 contemplates various functions performed by UE 105, nodes 110/115, SAS 140, EPC 120, and other functional entities as described above with respect to FIG. 1.

Generally speaking, the method 200 of FIG. 2 is directed to managing UE 105 associated with a network services provider capable of providing network services via either of the mid-band nodes 110 or low-band nodes 115 of the heterogeneous network 101 discussed above with respect to FIG. 1. In an exemplary embodiment, the method 200 contemplates that UE 105 authenticated to a mid-band CBSD node 110 of the mobile network 101 and experiencing a loss of PDCCH coverage thereto is able to recover from the resulting loss of new UL grants by cooperating with a proximate low-band node 115.

Specifically, as previously noted, proactive grants are used in dedicate uplink (UL) resources to UE in 5G standards. The eNB or base station determines the amount of resource blocks (RBs) and time of resource blocks usage for each UE in the network (e.g., such as defined in a resource block map communicated to UE via an UL grant schedule), and timing of UL grants can change anytime. This change is communicated with UE using a Physical Downlink Control Channel (PDCCH). In a regular 5G networks, the PDCCH coverage area is usually greater than the Physical Uplink Control Channel (PUCCH) coverage area. In CBRS networks, since transmission power of a CBSD can be decreased by the SAS at any time depending on interference, PDCCH coverage can be reduced at any time. This means that the PDCCH coverage can be smaller than PUCCH coverage area, which also means that the base station/eNB may not be able to pre-configure a UL grant schedule with the UE since the UL grant schedule is communicated to the UE via the PDCCH.

At step 210, UE attaches to the mobile network 101 via a CBSD node 110 (e.g., UE 105 attached to a mid-band node 110 of a 4G/LTE or 5G mobile network). Referring to box 215, the attachment comprises various known steps such as the UE being authenticated by the mobile network, and the UE being associated with a subscriber having a service level agreement (SLA) defining quality of service (QoS) and other metrics of network services to be provided to the subscriber UE. The international mobile subscriber identifier (IMSI) of the UE and other information is provided to the MME, along with the current tracking area of the UE, which is periodically updated as the UE location moves between different mid-band nodes 110 or sectors thereof, or different low-band nodes 115 or sectors thereof. Other functions are also contemplated during this attachment as is known. It is noted that the a CBSD node 110 is a mid-band mobile network node that has previously been registered with the SAS 140, and which has been granted spectrum by the SAS 140 for use in communicating with UE 105 and for performing other functions as is known. In addition, the SAS 140 has defined a transmit power for use by the CBSD node 110, which defines a transmission coverage area associated with the CBSD node 110.

At step 220, in response to a determination by the UE that the transmit coverage area of the CBSD node 110 no longer includes the UE (i.e., the PDCCH signal including new UL grants is no longer being received), the UE attaches to a low-band node 115 and transmits a message to the low-band node 115 to report the loss of PDCCH coverage and to identify the mid-band node 110 via, illustratively, its physical cell ID (PCI). It is noted that the UE does not detach itself from the mid-band node 110.

At step 230, the low-band node 115 receives the message from the UE and responsively transmits a back haul message to the EPC core 120 configured to cause a management entity therein to resolve an IP address associated with the PCI of the power-reduced CBSD node 110. Specifically, in various embodiments this message is configured to cause a session management function (SMF) of a 5G core to resolve the IP address of the CBSD node associated with the PCI and forward that IP address to the low-band node 115.

At step 240, the low-band node 115 receives the resolved IP address of the power-reduced CBSD node 110 and responsively uses the resolved IP address to transmits a back haul message to the power-reduced CBSD node 110 requesting a new UL grant schedule, which new UL grant schedule is transmitted within a message carried by the back haul network from the power-reduced CBSD node 110 to the low-band node 115. The new UL grant schedule include the identity of UE having UL grants defined therein via one or more of a Radio Network Temporary Identifier (RNTI), an International Mobile Subscriber Identifier (IMSI), an International Mobile Equipment Identity (IMEI), a Mobile Equipment Identifier (MEID), an Electronic Serial Number (ESN), or some other UE identification/identifier.

At step 250, the low-band node 115 transmits the received new UL grant schedule to the UE reporting the PDCCH coverage loss, any UE attached to the low-band node 115 that recently reported a PDCCH coverage loss associated with the same PCI, and/or any UE attached to the low-band node 115 identified in the received new UL grant.

At step 260, each relevant UE (i.e., UE having lost PDCCH coverage from the CBSD node 110) receiving the new UL grant schedule associated with the CBSD node 110 examines the new UL grant schedule and transmits data to the CBSD node 110 in accordance with its respective uplink slots or resource blocks as allocated to the UE via the UL grant schedule (e.g., such as defined in a resource block map communicated to UE via the UL grant). Specifically, each relevant UE flushes its uplink/output buffer via data transmission to the mid-band node (i.e., CBSD node 110) in accordance with respective UL grants, optionally and additionally via contemporaneous data transmission to the low-band node 115. Further, each relevant UE then waits for its mid-band node PDCCH coverage to return (i.e., for a PDCCH signal including new UL grants to be received from the mid-band node). The UE wait time may be defined in accordance with a predetermined, default or programmable waiting period, a waiting period that ends when data transmission is deemed to be necessary (e.g., a need to transmit time-sensitive or priority data, a determination that an uplink/output buffer is above a threshold utilization level, etc.), and/or some other criteria.

At step 270, each relevant UE having determined within its wait time that PDCCH coverage has returned (i.e., having received from the CBSD node 110 a PDCCH signal including new UL grants) may detach from the low-band node 115, in which case the low-band node 115 may tear down the session created for the UE.

At step 280, each relevant UE having determined within its wait time that PDCCH coverage has not returned, may detach from the CBSD node 110 and (1) attach to the mobile network via a new/available CBSD node 110, (2) remain attached to the mobile network via the current low-band node, (3) attach to the mobile network via a new/available low-band node, or (4) attach to the mobile network via some other node (e.g., a base station, gNB, or eNB of a mobile virtual network operator (MVNO) partner or third party.

The above-described embodiments are primarily directed to the issue of a loss of UE inability to receive the UL grant schedule due to a reduction in CL coverage area/distance, such as due to a reduction in power of a CBSD node (in which case data for the UE within the relevant DL slots will also be lost). It is noted that PDSCH coverage area/distance is always shorter then PDCCH, and control coverage will be lost later once the UE loses data (PDSCH) coverage. In various embodiments, a low-band node (e.g., a 600 MHz gNB) may send grant schedule information to UE once the CBSD coverage is lost.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for allocating resources in a 5G network comprising Citizens Broadband Radio Service Device (CBSD) nodes and non-CBSD nodes configured for communicating with user equipment (UE), the method comprising:

at a non-CBSD node, receiving a UE message reporting a physical cell ID (PCI) of a CBSD node to which the UE was attached prior to losing Physical Downlink Control Channels (PDCCH) coverage of the CBSD;

at the non-CBSD node, transmitting toward a 5G core manager a message configured to cause a session management function (SMF) to resolve an internet protocol (IP) address associated with the reported PCI, and to forward to the non-CBSD node a message including the resolved IP address of the reported PCI;

at the non-CBSD node, using the resolved IP address of the reported PCI to transmit toward a corresponding CBSD node a request for a new uplink grant schedule; and at the non-CBSD node, transmitting a received new UL grant schedule toward a source UE of the received UE message, the new UL grant schedule being configured to enable the source UE to transmit data toward the CBSD node via resource blocks allocations defined within the UL grant schedule.

2. The method of claim 1, further comprising the non-CBSD node transmitting the new UL grant schedule to each UE reporting the PCI of the CBSD node.

3. The method of claim 1, wherein the received new UL grant schedule includes identification of UE recently attached to the non-CBSD node, the method further comprising the non-CBSD node transmitting the new UL grant schedule to each UE identified in the received new UL grant.

4. The method of claim 3, wherein the UE identification comprises at least one of a Radio Network Temporary Identifier (RNTI), international mobile subscriber identifier (IMSI), International Mobile Equipment Identity (IMEI), mobile equipment identifier (MEID), and Electronic serial numbers (ESN).

5. The method of claim 1, wherein the non-CBSD node comprises a 600 MHz base station.

6. The method of claim 1, wherein the non-CBSD node comprises an eNB.

7. The method of claim 1, wherein the non-CBSD node comprises a wireless access point (WAP).

8. The method of claim 1, wherein the non-CBSD node comprises a gNB.

9. The method of claim 1, further comprising:
at UE receiving a new UL grant schedule from the non-CBSD node, transmitting UE output buffer data toward the CBSD node in accordance with the new UL grant schedule.

10. The method of claim 9, wherein the UE receiving a new UL grant schedule from the non-CBSD node comprises UE having reported the PCI of the CBSD node associated with the new UL grant schedule.

11. The method of claim 9, wherein the UE receiving a new UL grant schedule from the non-CBSD node comprises UE identified in the new UL grant schedule.

12. The method of claim 9, further comprising:
at UE receiving a new UL grant schedule from the non-CBSD node, in response to a failure of restoration of PDCCH coverage of the CBSD within a predetermined amount of time, attaching to the 5G network via a new CBSD node.

13. The method of claim 9, further comprising:
at UE receiving a new UL grant schedule from the non-CBSD node, in response to a failure of restoration of PDCCH coverage of the CBSD within a predetermined amount of time and an inability to attach to a new CBSD node within the 5G network, attaching to a non-CBSD node within the 5G network.

14. The method of claim 13, wherein the non-CBSD node comprises one of a 600 MHz base station, an eNB, and a gNB.

15. The method of claim 1, wherein the non-CBSD node comprises a wireless access point (WAP).

16. In a 5G network comprising Citizens Broadband Radio Service Device (CBSD) nodes and non-CBSD nodes configured for communicating with user equipment (UE), a non-CBSD node configured for:

receiving a UE message reporting a physical cell ID (PCI) of a CBSD node to which the UE was attached prior to losing Physical Downlink Control Channels (PDCCH) coverage of the CBSD;

transmitting toward a 5G core manager a message configured to cause a session management function (SMF) to resolve an internet protocol (IP) address associated with the reported PCI, and to forward to the non-CBSD node a message including the resolved IP address of the reported PCI;

using the resolved IP address of the reported PCI to transmit toward a corresponding CBSD node a request for a new uplink grant schedule; and transmitting a received new UL grant schedule toward a source UE of the received UE message, the new UL grant schedule being configured to enable the source UE to transmit data toward the CBSD node via resource blocks allocations defined within the UL grant schedule.

17. In a 5G network comprising Citizens Broadband Radio Service Device (CBSD) nodes and non-CBSD nodes configured for communicating with user equipment (UE), UE configured for:

transmitting toward a non-CBSD node a UE message reporting a physical cell ID (PCI) of a CBSD node to which the UE was attached prior to losing Physical Downlink Control Channels (PDCCH) coverage of the CBSD, the UE message being configured to (1) cause a session management function (SMF) to resolve an internet protocol (IP) address associated with the reported PCI, and to forward to the non-CBSD node a message including the resolved IP address of the reported PCI, (2) cause the non-CBSD node to use the resolved IP address of the reported PCI to transmit toward a corresponding CBSD node a request for a new uplink grant schedule, and (3) cause the corresponding CBSD node to transmit a new UL grant schedule toward the UE;

receiving the new UL grant schedule; and transmitting output buffer data toward the CBSD node via resource blocks allocations defined within the new UL grant schedule.

18. The UE of claim 17, wherein the UE is further configured for attaching to the 5G network via a new CBSD node in response to a failure of restoration of PDCCH coverage of the CBSD within a predetermined amount of time after receiving the new UL grant schedule.

19. The UE of claim 17, wherein the UE is further configured for attaching to a non-CBSD node within the 5G network in response to a failure of restoration of PDCCH coverage of the CBSD within a predetermined amount of time and an inability to attach to a new CBSD node within the 5G network.

20. The UE of claim 17, wherein the non-CBSD node comprises one of a 600 MHz base station, an eNB, and a gNB.

21. The UE of claim 17, wherein the non-CBSD node comprises a wireless access point (WAP).

* * * * *